United States Patent
Wolf

[15] 3,640,199
[45] Feb. 8, 1972

[54] PHOTOGRAPHIC SCAN CAMERA USING A PIVOTED MIRROR

[72] Inventor: Jesse David Wolf, Golden, Colo.
[73] Assignee: Trans-Horizons, Inc., Ontario, Calif.
[22] Filed: June 19, 1970
[21] Appl. No.: 47,250

[52] U.S. Cl. .................................................. 95/15
[51] Int. Cl. .......................................... G03b 37/02
[58] Field of Search ............................. 95/12.5, 15

[56] References Cited

UNITED STATES PATENTS

| | | | |
|---|---|---|---|
| 2,834,889 | 5/1958 | Fries | 95/15 X |
| 3,234,865 | 2/1966 | Scott | 95/15 X |
| 3,427,944 | 2/1969 | Hatfield | 95/15 |
| 3,468,230 | 9/1969 | Bellows | 95/15 |
| 3,532,039 | 10/1970 | Rising | 95/15 X |

Primary Examiner—Samuel S. Matthews
Assistant Examiner—Fred L. Braun
Attorney—Berman, Davidson and Berman

[57] ABSTRACT

A continuously rotated panoramic camera mounted on a support having a fixed semicircular cam concentric with the axis of rotation of the camera. The camera is provided with an offset angled mirror fixed relative to the camera and with a pivoted mirror carrying a dog engageable with the cam to rotate the pivoted mirror into the field of view of the camera and into a position to receive images reflected from the angled fixed mirror. The parts are so arranged that in the course of a revolution, after the camera has scanned 180° of a scene during the first half of the revolution, the pivoted mirror is rotated by the dog and cam into a position causing the camera to repeat this scan during the second half of the revolution.

14 Claims, 9 Drawing Figures

3,640,199

PATENTED FEB 8 1972

INVENTOR.
JESSE DAVID WOLF,

BY
Berman, Davidson & Berman,
ATTORNEYS.

INVENTOR.
JESSE DAVID WOLF,
BY
Berman, Davidson & Berman,
ATTORNEYS.

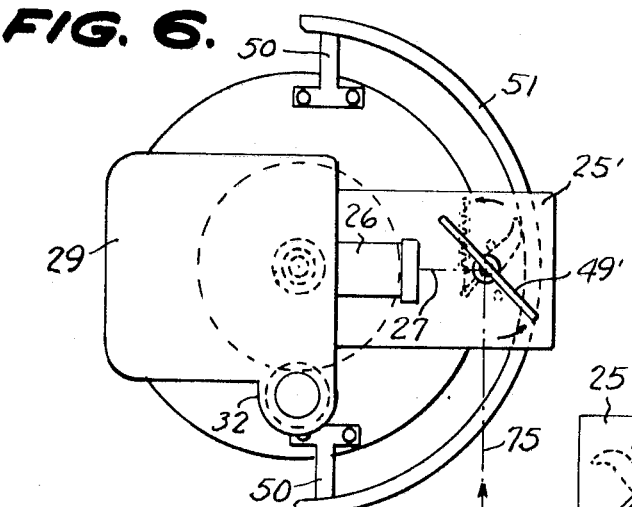
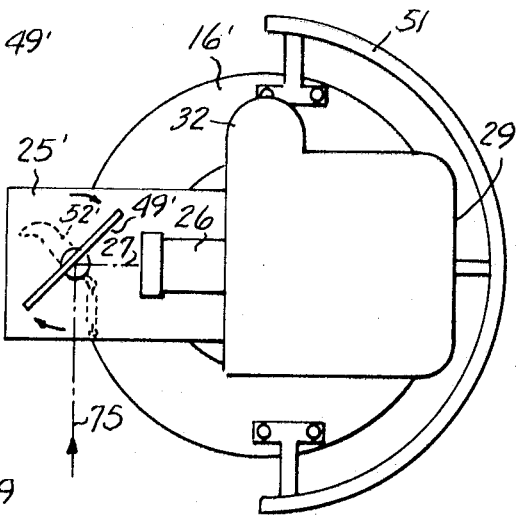
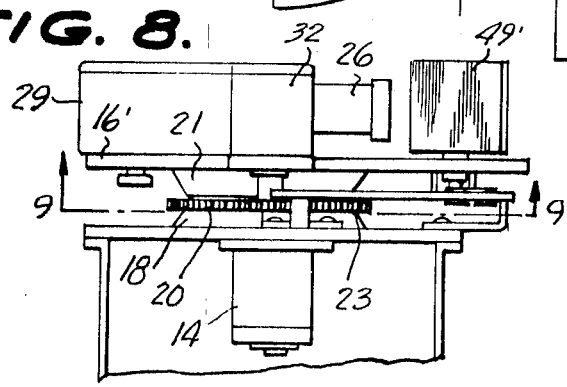
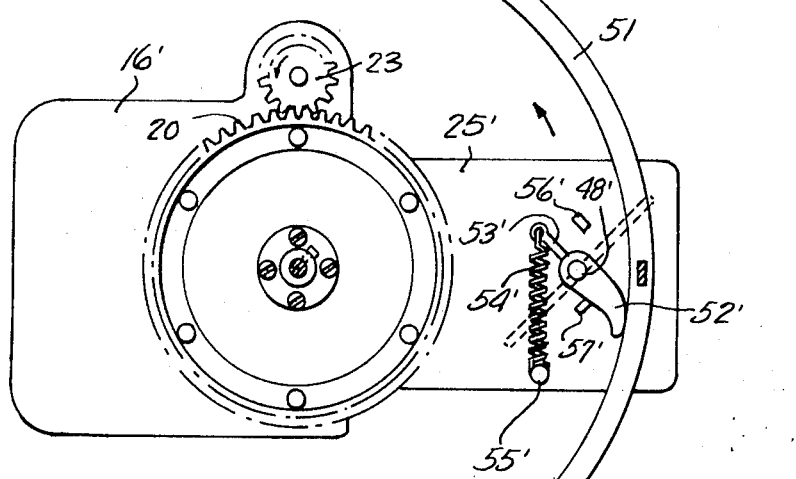

PHOTOGRAPHIC SCAN CAMERA USING A PIVOTED MIRROR

This invention relates to panoramic cameras, and more particularly to a panoramic camera of the type providing continuously repeated scans of a particular scene.

A main object of the invention is to provide a novel and improved panoramic camera of the repetitive-scanning type employed to provide continuously repeated scans of a particular scene, the camera mechanism being relatively simple in construction, being easy to set up for use, and involving a relatively small number of moving parts.

A further object of the invention is to provide an improved panoramic camera arranged to provide continuous scanning of a semicircular field of view, the camera assembly involving inexpensive components, being relatively compact in size, being reliable in operation and requiring a minimum amount of maintenance.

A still further object of the invention is to provide an improved panoramic camera of the type employed to continuously scan a substantially semicircular field of view, the camera being provided with a mechanism which does not require mechanical reversal of the direction of rotation of the rotating parts, whereby the mechanical parts are not subjected to undue shock or vibration and whereby the parts are not shaken out of correct optical adjustment.

A still further object of the invention is to provide am improved panoramic camera of the type providing continuously repeated scans of a given scene, the camera assembly employing relatively simple optical parts, and the mechanism being arranged so that it will successfully operate over long periods of time without requiring adjustment or repair.

Further objects and advantages of the invention will become apparent from the following description and claims, and from the accompanying drawings, wherein:

FIG. 6 is a top plan view of a camera and pivoted mirror assembly representing a modification employing a single mirror, shown with the pivoted mirror assembly in cam-engaging position.

FIG. 7 is a top plan view similar to FIG. 6, but with the mirror assembly disengaged from the mirror control cam, so that the mirror field of view is reversed relative to the camera, as compared with FIG. 6.

FIG. 8 is a front elevational view of the structure shown in FIG. 6.

FIG. 9 is a horizontal cross-sectional view taken substantially on line 9—9 of FIG. 8.

Figure 2:
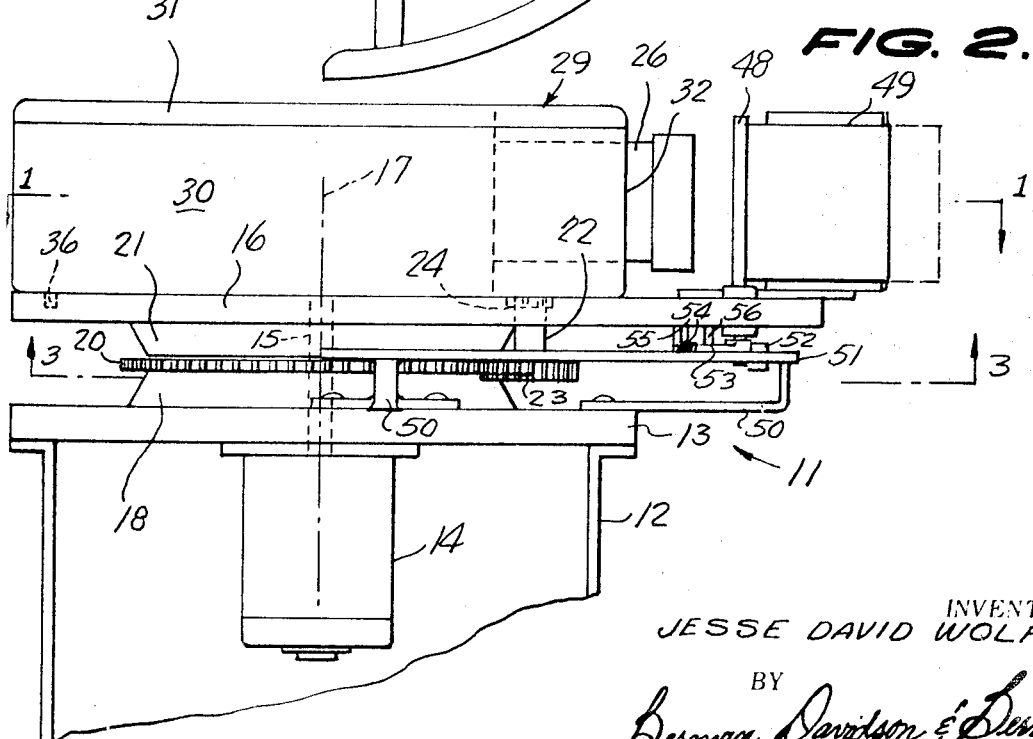
FIG. 2 is a side elevational view of the camera assembly of FIG. 1.

Referring to the drawings, 11 generally designates an improved panoramic camera assembly constructed in accordance with the present invention. The assembly 11 comprises a suitable stationary fixed support, designated generally at 12, having a horizontal top plate 13. Mounted vertically on the support, for example, by being secured centrally to the top plate 13 as shown in FIG. 2, is an electric motor 14. The electric motor 14 is provided with an upwardly projecting shaft 15 to the top end of which is secured a horizontally extending platform member 16 which is journaled relative to the support 12 for rotation around the vertical axis of the motor 14, shown at 17.

Plate member 13 is provided with the upwardly frustoconical boss element 18 coaxial with the motor 14, and rigidly mounted on the top end of the boss 18 is the coaxial large fixed gear 20. The platform element 16 has a depending frustoconical bottom boss 21 coaxial with motor 14 which is rotatably supported over the top surface of gear 20. The frustoconical elements 18 and 21 are hollow and may comprise respective upwardly and downwardly convergent skirt elements, with the ring gear 20 secured on the top rim of the lower skirt element 18. The upper depending frustoconical element 21 may be rotatably supported on the top rim of the lower frustoconical element 18, or alternatively, the platform element 16 may be rotatably supported relative to plate member 13 merely by the rigid connection of said platform element to the top end of shaft 15.

Journaled in the platform element 16 is a depending vertical shaft 22 carrying a pinion gear 23 which meshes with the fixed large gear 20 and which thereby causes the shaft 22 to rotate in a planetary fashion around the large gear 20 responsive to the rotation of platform element 16 by the motor 14. The shaft 22 is provided at its top end with a conventional drive socket 24 which likewise rotates when platform element 16 is rotated around the axis 17.

Figure 1:
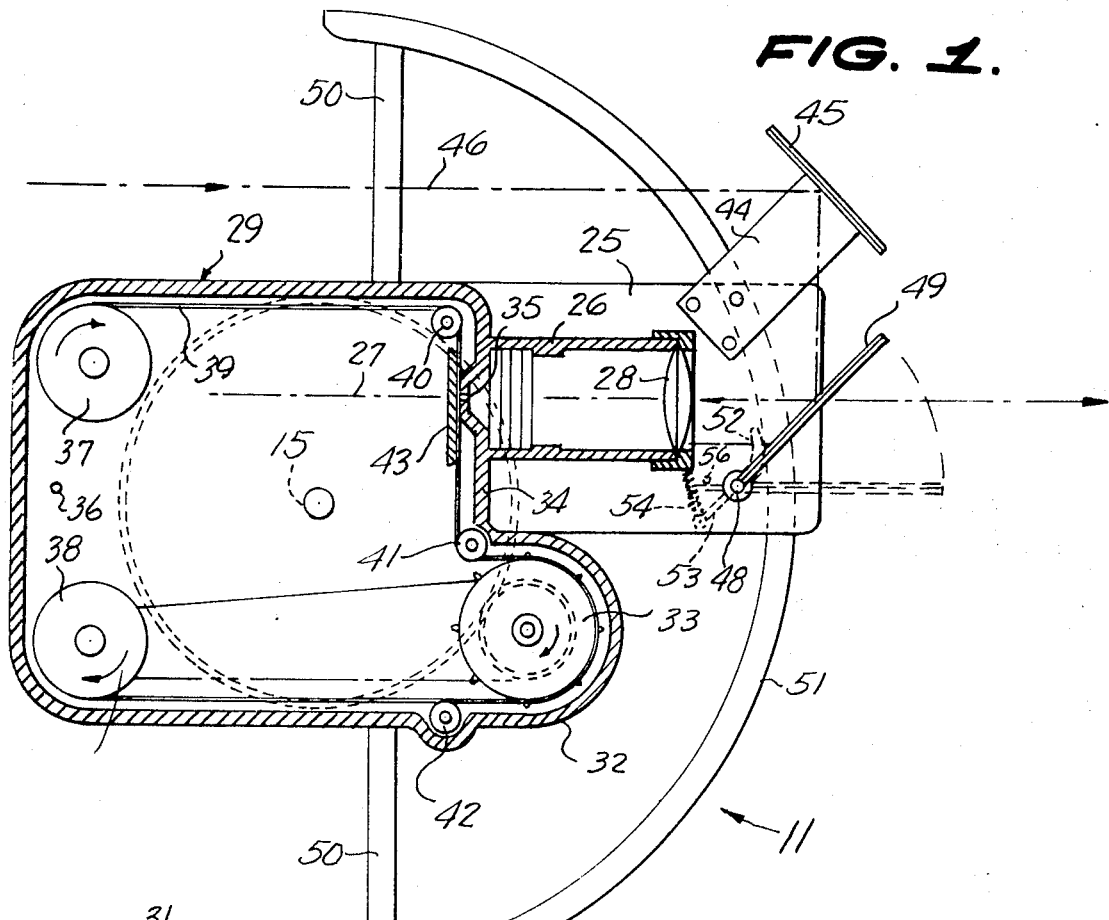
FIG. 1 is a horizontal cross-sectional view taken through a camera constructed in accordance with the present invention, said view being taken substantially on line 1—1 of FIG. 2.

The platform member 16 is formed with an outwardly projecting reduced arm 25 on which is mounted a camera lens assembly 26 having an outwardly directed optical axis 27, as shown in FIG. 1. The lens assembly 26 may comprise a lens tube provided with a camera lens 28 at its outer end. The tube is horizontally mounted and is so arranged that the assembly 26 can be combined with a removable cassette 29 to form a camera assembly, as will be presently described.

The cassette 29 comprises a housing 30 having a removable top cover 31, the housing being formed with the forwardly projecting portion 32 in which is journaled a film sprocket drive wheel 33, the shaft of the drive wheel depending from the bottom of the housing and being suitably formed to intermesh with the drive socket 24 carried by shaft 22. The front wall 34 of the housing 30 is formed with a camera aperture 35 located so as to register with the optical axis 27 and to engage against the left end of the optical lens assembly 26 when the depending driving element of the sprocket wheel 33 is meshingly interlocked with the drive socket 24, providing the arrangement illustrated in FIGS. 1 and 2.

The cassette 29 may be provided with additional conventional means to insure accurate positioning thereof on the platform element 16, for example, may be provided with depending pilot lugs 36 receivable in positioning recesses provided on the platform member 16.

The camera cassette 29 is provided with a film supply spindle 37 and a film takeup spindle 38. The takeup spindle 38 may be suitably driven from the shaft of the sprocket wheel 33 in a conventional manner to wind up film 39 thereon as the film is moved past the cassette exposure aperture 35 by the sprocket wheel 33. The film 39 engages around a first guide pulley 40 journaled in the corner portion of the housing 30 at one side of the aperture 35, then engages around a second guide pulley 41 journaled in the housing 30 at the opposite side of the aperture 35, the film then engaging around the sprocket wheel 33 and passing a third guide roller 42 journaled in the housing 30 between the drive sprocket 33 and the takeup reel 38.

A transversely extending guide plate 43 is provided in the housing 30 adjacent to the aperture 35 for supporting the film as it moves past the aperture 35 and for maintaining the film substantially flat as it is being exposed to light rays from the lens 28.

The rate of movement of the film 39 is in accordance with the rate of rotation of the camera assembly 29–26, since the drive sprocket 33 is gearingly coupled to the stationary gear 20 through the pinion gear 23. The light rays forming images on the film are progressively directed thereto through the slit or aperture 35, with the film moving at a suitable rate concurrently with the rotation of the camera assembly around the axis 17, in a manner well known in the art of panoramic photography.

Rigidly secured to the forward portion of the platform member arm 25 and projecting forwardly and laterally therefrom, namely, upwardly and to the right, as viewed in FIG. 1, is a bracket member 44 to the outer end of which is rigidly secured an upstanding, substantially vertical plane mirror 45 oriented at an angle of 45° to the optical axis 27 and sufficiently laterally offset from the camera housing 29 as to receive light rays from objects behind the camera, for example, the light rays such as 46 shown in FIG. 1. It will be further noted that the upstanding angled mirror 45 is spaced forwardly of the plane of the lens 28.

Vertically journaled to the forward portion of the platform arm member 25 on the opposite side of the optical axis 27, relative to the bracket 44, is a shaft member 48 to which is rigidly secured a vertical plane mirror 49, the mirror 49 being located opposite the fixed mirror 45 and being swingable into a position intersecting the optical axis 27 and oriented at an angle of substantially 45° therewith, as shown in full line view in FIG. 1, being thus located at times to receive light rays 46 reflected from the inclined mirror 45 and to reflect such light rays substantially in the direction of the optical axis 27, namely, through the lens 28 to the film surface at the exposure slit 35, which is substantially in the focal plane of the lens, in accordance with well-known principles of photography. The mirror 49, however, is biased in a manner presently to be described toward a normal position, shown in dotted view in FIG. 1, wherein it is oriented substantially parallel to and spaced laterally from the optical axis 27, so that it cannot reflect light rays from mirror 45 into the lens 28.

Rigidly secured to the stationary support plate 13, for example, by radial bracket arms 50, is a semicircular horizontal cam bar 51 which is arranged concentrically with the rotation axis 17 of the camera assembly. Rigidly secured to the bottom end of the mirror shaft 48 is a follower dog 52 which is provided with a diametrically oppositely extending arm 53 connected by a coil spring 54 to an anchor pin 55 in the platform element 25, biasing the shaft 48 in a clockwise direction, as viewed in FIG. 1, and thereby normally causing the arm 53 to engage a stop pin 56 depending from platform 25. When the arm 53 engages the stop pin 56 the rotatable mirror 49 is held in its dotted view position shown in FIG. 1, namely, in a nonintersecting position with respect to the camera optical axis 27, whereby the mirror 49 is inoperative to reflect images from the fixed mirror 45 to the camera lens 28.

Figure 3:
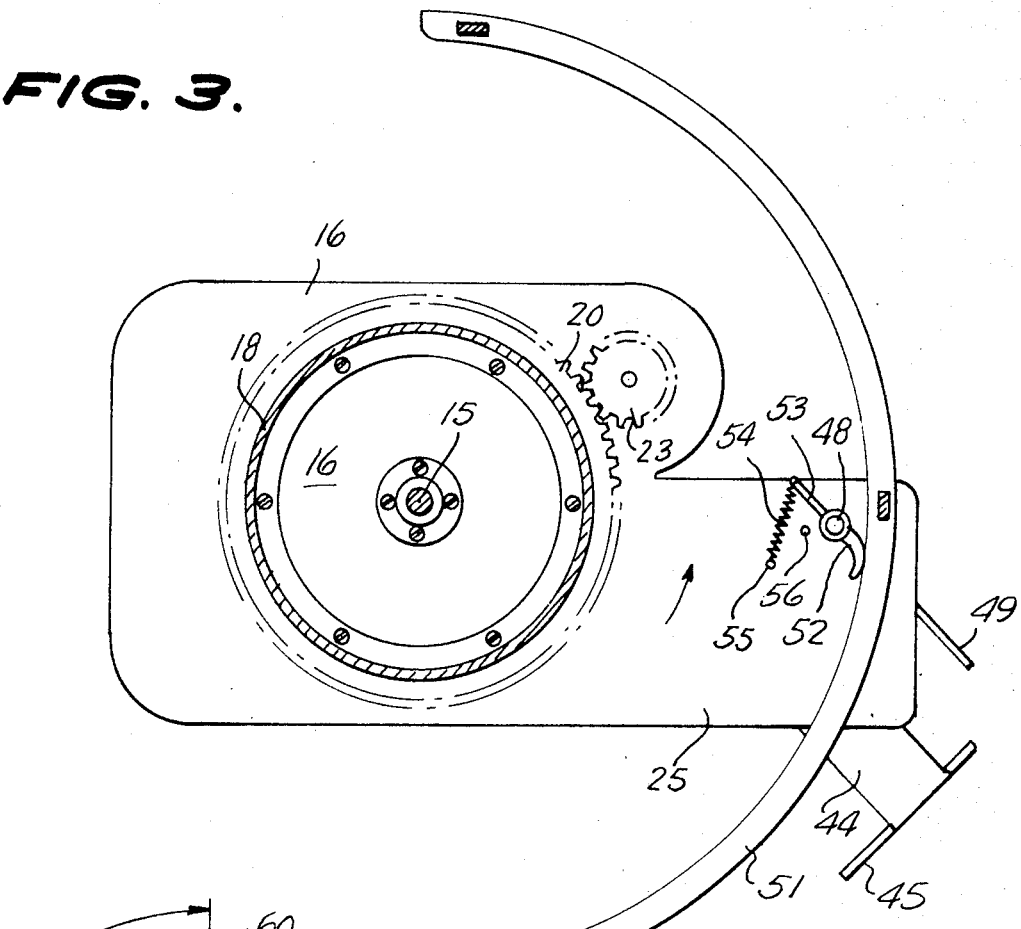
FIG. 3 is a horizontal cross-sectional view taken substantially on line 3—3 of FIG. 2.

The follower dog 52 is located so as to be engageable with the inside surface of the cam bar 51 after the camera assembly has completed one-half of a revolution, whereupon the mirror shaft 51 is then rotated substantially 45° to the angled working position shown in full line view in FIG. 1, to thereby reflect images from the inclined fixed mirror 45 to the camera lens 28 in the manner above described. Thus, when the follower dog element 52 engages the lower end of the cam bar 51, as viewed in FIG. 3, the mirror 49 is swung from its dotted view position shown in FIG. 1 to its angled working position, shown in full line view, and the mirror 49 remains in this working position as long as the follower dog element 52 continues to engage the inside surface of the cam bar 51. As will be readily apparent from FIG. 3, the biasing spring 54 acts on the follower dog element 52 to maintain it in close sliding contact with the semicircular cam bar 51, thereby holding the inclined mirror 49 in its working position, shown in full line view in FIG. 1. The mirror 49 is held in this position for the next half revolution of the camera assembly, whereby the same scene as was previously photographed in the first one-half revolution of the camera assembly is again photographed. After the follower dog element 52 disengages from the semicircular cam element 51, the mirror 49 returns to the dotted view position thereof shown in FIG. 1, by the action of the biasing spring 54, which then moves the arm 53 into engagement with the stop pin 56.

Figure 4:
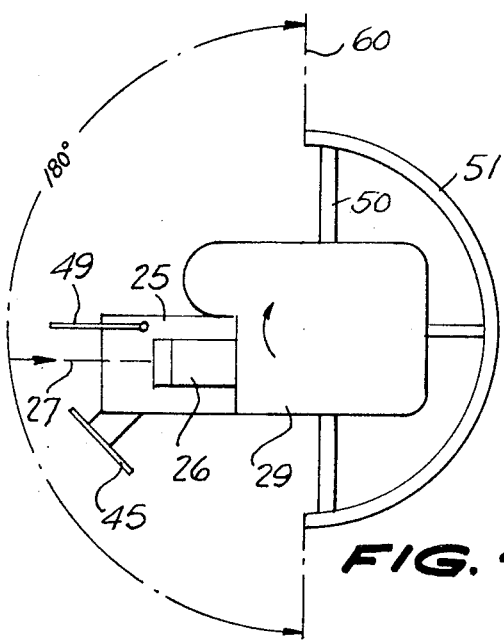
FIG. 4 is a diagrammatic top plan view, to a reduced scale, showing the camera assembly of FIGS. 1, 2 and 3 in a position wherein direct scanning by the camera lens takes place.
Figure 5:
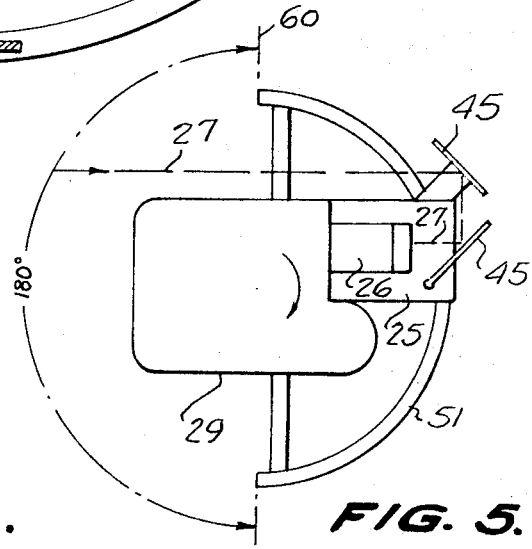
FIG. 5 is a diagrammatic top plan view, similar to FIG. 4, showing the camera assembly in a position diametrically opposite to that of FIG. 4, wherein the parts of the camera are automatically adjusted to provide indirect scanning of the same scene as that scanned with the camera in the position of FIG. 4.

First, as is diagrammatically shown in FIG. 4, in the normal operation of the camera assembly 26–29, assuming clockwise rotation thereof, the mirror 49 is held in an inoperative position substantially parallel to the camera optical axis 27. In FIG. 4, it is assumed that the scene to be photographed is that which is visible to the left of the transverse vertical plane designated by the section line 60 in FIG. 4. Therefore, while the camera assembly is being rotated clockwise through the 180° arc required to scan the scene at the left of the plane 60 in FIG. 4, the mirror 49 is in a position parallel to the camera optical axis 27 and does not interfere with the normal action of the camera. As the camera assembly completes the first 180° of rotation thereof, and the lens assembly 26 moves clockwise to the right of the plane 60, the follower dog element 52 engages the semicircular cam bar 51 and rotates the mirror 45 to the inclined working position thereof, shown in FIG. 5, wherein it is oriented at substantially 45° to the optical axis 27 in a position to receive light rays from the original scene, reflected from the 45° angled mirror 45 as above explained. Therefore, the same scene is photographed as in the previous 180° rotation of the camera assembly, namely, the scene to the left of the plane 60. The result is that with continued rotation of the camera assembly in a clockwise direction, a series of panoramic photographs is made of the same scene, one photograph being made for each 180° of rotation of the camera assembly 26–29. The photographs are made on the film 39, which moves concurrently with the rotation of the camera assembly, so that the film contains a succession of photographs of the same scene, taken sequentially, and representing all events taking place in the scene during the respective scans thereof made by the camera assembly.

When the film 39 has been completely exposed, the cassette 29 may be removed and replaced by another cassette containing fresh film. It is therefore possible to obtain a photographic record of events taking place in a given scene over a substantial period of time with minimum interruption.

FIGS. 6, 7, 8 and 9 represent a modification of a system similar to that described above but employing a single mirror 49'. The modified arrangement of FIGS. 6 through 9 employs a platform member 16', somewhat similar to the platform member 16 previously described, except that the member 16' is provided with the outwardly projecting reduced arm 25' which is approximately centrally located relative to the platform member 16' rather being laterally offset as in the case of the previously described form of the invention. The cassette 29 and associated parts are supported on the platform member 16' in the same manner as in the previously described form of the invention, and its film transport mechanism is the same as in said previously described form. The single mirror 49' is mounted on a vertical shaft member 48' which is journaled in the platform arm 25', the shaft 48' being located substantially in the central vertical plane, namely, being substantially in the same vertical plane as the optical axis 27 of the camera lens system 26. The shaft member 48' is provided with an arm 53' at its lower portion which is connected by a biasing spring 54' to an anchor pin 55' secured to arm 25', so that the shaft member 48' is biased in a counterclockwise direction, as viewed in FIG. 9. Secured to the bottom end portion of the shaft is the horizontally outwardly extending follower dog 52' which is engageable with the semicircular cam bar 51 substantially in the same manner as in the previously described form of the invention. However, when the follower dog 52' engages the arcuate cam bar 51, for example, as illustrated in FIG. 9, the mirror 49' is positioned at an angle of 45° to the optical axis 27, as shown in FIG. 6, to receive light rays coming from objects located at the side of the camera provided with the projection portion 32, whereas when the follower dog 52' is free of the bar 51, as in FIG. 7, the spring 54' moves the mirror by an angle of 90° around the axis of the shaft 48' to a position wherein the mirror 49' is at 45° to the optical axis 27, but is oppositely rotated relative to the camera, as compared with its position of FIG. 6. Thus, in the position of FIG. 7, the mirror 49' is oriented to receive rays of light from objects at the side of the camera opposite to that having the projection portion 32. In other words, the field of view of the camera is reversed from the field provided in FIG. 7 to the field provided in FIG. 6, in relation to the camera, when the follower dog 52' engages the cam bar 51. The mirror 49' is limited to the 45° position of FIG. 9 by the engagement of the follower dog 52' with a first upstanding stop lug 57' mounted on arm 25', as shown in FIG. 9. When the follower dog 52' is disengaged from the cam bar 51, the spring 54' will rotate the follower dog to another position established by the engagement of the follower dog 52' with a second upstanding stop lug 56' provided on arm 25'. In the second named position, the mirror 49' is also at 45° to the optical axis but the field of view of the camera is reversed, as above described.

It will be readily apparent that with the apparatus of FIGS. 6 through 9 suitably oriented, the camera field of view will be automatically reversed after each 180° scan movement of the mechanism, so that the camera will repeatedly scan the same scene, in the same manner as described above in connection with the form of the invention illustrated in FIGS. 1 through 5. As will be apparent from FIGS. 6 and 7, the light rays 75 which reach the camera lens assembly from the scene will always travel from the same scene to the camera, with two scans thereof being provided with each complete revolution of the camera.

While certain specific embodiments of an improved continuously rotated panoramic camera assembly have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a panoramic camera, a support, platform means rotatably mounted on said support for rotation around a vertical axis, a camera mounted on said platform means and being directed outwardly with respect to said axis, mirror means on the platform means, said mirror means including a mirror pivotally mounted on said platform means, means biasing said mirror toward a first position, and cooperating cam and follower means on the support and the mirror constraining said mirror to assume a second position rotated from said first position during substantially one-half the cycle of rotation of said platform means around said vertical axis, said mirror intersecting the optical axis of and being in the field of view of the camera in at least one of said positions, and being angled to provide a camera field of view in said one position which is substantially diametrically opposite to the field of view of the camera when the mirror is in its other position.

2. The panoramic camera of claim 1 and wherein said camera is provided with film transport means for moving film transversely across said optical axis and cooperating guide means on the support and the camera to actuate said film transport means responsive to rotation of said platform means on said support.

3. The panoramic camera of claim 2 and wherein said guide means comprises a fixed gear on said support coaxial with the axis of rotation of said platform means, a pinion gear journaled relative to said platform means meshing with said fixed gear, and means drivingly connecting said pinion gear to said film transport means.

4. The panoramic camera of claim 1 and wherein said cam and follower means comprises an arcuate cam bar on the support concentric with said vertical axis and subtending an angle of approximately 180°, and a follower element connected to said pivotally mounted mirror and being engageable with said cam bar.

5. The panoramic camera of claim 4, and wherein the pivotally mounted mirror is mounted so as to intersect the optical axis of the camera in both its first and second positions.

6. The panoramic camera of claim 5 and wherein said second position is angularly spaced approximately 90° from said first position around the axis of rotation of the pivotally mounted mirror.

7. The panoramic camera of claim 6 and wherein the pivotally mounted mirror makes an angle of approximately 45° with the optical axis of the camera in either its first or its second position.

8. The panoramic camera of claim 4 and wherein said pivotally mounted mirror is mounted on said platform means for rotation on a vertical axis.

9. The panoramic camera of claim 8, and wherein the pivotal axis of said pivotally mounted mirror is laterally offset from the optical axis of the camera.

10. The panoramic camera of claim 9 and wherein said mirror means further includes a second mirror fixedly mounted on said platform means at a position offset from said camera and angled to receive light rays from images behind the camera, said pivotally mounted mirror being swingable to a working position intersecting said optical axis and angled to reflect light rays from the fixedly mounted mirror to the camera substantially in the direction of said optical axis.

11. The panoramic camera of claim 10 and wherein said fixedly mounted mirror is vertically mounted on said platform means and is laterally offset from said camera.

12. The panoramic camera of claim 11, and wherein said fixedly mounted mirror is angled at substantially 45° to said optical axis.

13. The panoramic camera of claim 12 and wherein said biasing means comprises a spring connecting said follower means to said platform means and urging said pivoted mirror toward a position laterally spaced from said optical axis.

14. The panoramic camera of claim 13 and stop means limiting the pivoted mirror to a position substantially parallel to said optical axis.

* * * * *